May 14, 1929.  J. R. THONET  1,712,854
PHOTOGRAPH ENLARGING MACHINE
Filed July 26, 1926   3 Sheets—Sheet 1

Inventor:
Joseph R. Thonet
by Chas. F. Verkuis Atty

May 14, 1929. J. R. THONET 1,712,854
PHOTOGRAPH ENLARGING MACHINE
Filed July 26, 1926 3 Sheets-Sheet 2

Inventor:
Joseph R. Thonet
by Chas. L. Perkins Atty.

May 14, 1929.  J. R. THONET  1,712,854
PHOTOGRAPH ENLARGING MACHINE
Filed July 26, 1926   3 Sheets-Sheet 3

Inventor:
Joseph R. Thonet
by Chas. F. Perkins Atty.

Patented May 14, 1929.

1,712,854

UNITED STATES PATENT OFFICE.

JOSEPH R. THONET, OF WAKEFIELD, MASSACHUSETTS, ASSIGNOR TO SPRAGUE-HATHAWAY MANUFACTURING CO., OF SOMERVILLE, MASSACHUSETTS.

PHOTOGRAPH-ENLARGING MACHINE.

Application filed July 26, 1926. Serial No. 124,945.

This invention relates to a photograph enlarging apparatus and has for its object to provide an apparatus for enlarging photographs from a negative in a rapid and efficient manner, the various mechanisms comprising the apparatus being so arranged relatively to each other that the operations of changing the negatives and sensitized material, and of positioning the negative relatively to said sensitized material to obtain the enlargement desired, may all be accomplished in such a rapid manner that it is possible to produce enlarged photographs from small negatives at no greater expense than has heretofore been accrued in producing the photographs the same size as the relative negatives.

It is still further an object of the invention to so construct the casing of the apparatus and holder for the negative that the latter may be supported at a convenient angle upon the former during the operation of inserting the negative in and removing the same from said holder, there being a small electric light bulb provided and so positioned relatively to said negative holder that during the operation of changing the negative said light may be directed upon the negative holder in a manner to aid the operator in positioning the negative within the holder, and a switch is provided in the electric circuit to said electric light bulb, said switch being operated automatically by the negative holder during its insertion in the casing and its removal therefrom to turn said electric light bulb off and on.

It is still further an object of the invention to provide a novel construction of holder for the sensitized material, said construction making it possible to quickly insert said material in, or remove the same from said holder and position the latter relatively to the negative.

The invention consists in an apparatus for enlarging photographs from a negative, as set forth in the following specification and particularly as pointed out in the claims thereof.

Referring to the drawings:—

Like numerals refer to like parts throughout the several views of the drawings.

Figure 1:
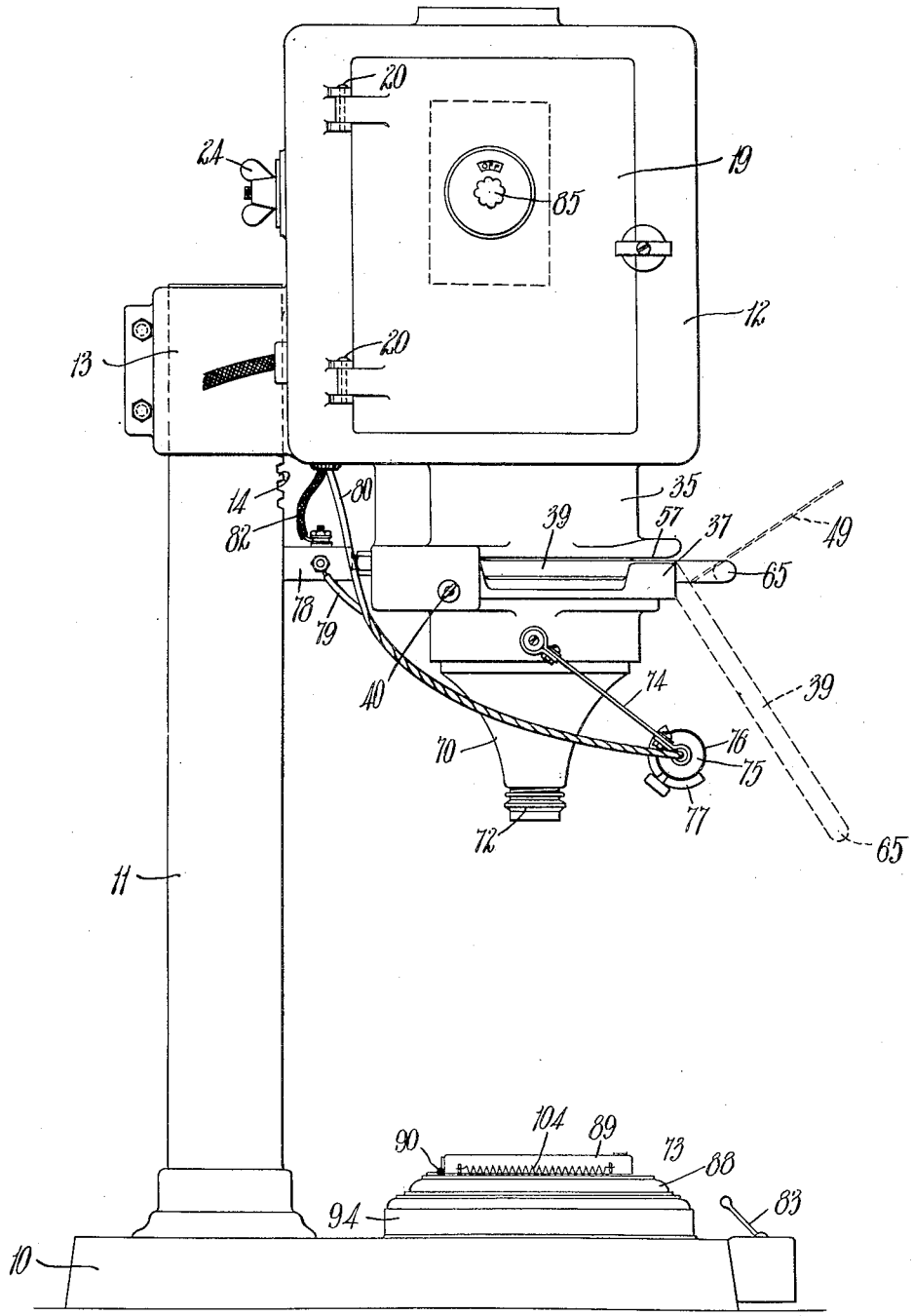
Figure 1 represents a side elevation of a photograph enlarging apparatus embodying my invention.

In the drawings, 10 represents a base, 11 is a standard secured to and projecting upwardly from said base, and 12 is a casing which is mounted to slide vertically upon said standard 11, said casing being secured to said standard by a clamp 13, which is formed integral with said casing. The base 10, standard 11 and casing 12 constitute a frame for the apparatus. As an aid in adjusting the casing 12 upon the standard 11, the standard is provided with a plurality of rack teeth 14, and mounted upon a shaft 15 within the casing 12 is a gear 16 which meshes with said rack teeth 14. The shaft 15 is rotated by a suitable handle 17, which is rigidly fastened to said shaft.

The casing 12 is preferably constructed of aluminum and is provided with a chamber 18 upon the interior thereof, to which access is had through a door 19, the latter being pivoted upon the exterior of said casing at 20. A vent opening 21 is provided in the top of the casing 12.

Located within the chamber 18 is a bracket 22, which is movable both vertically and longitudinally in a slot 23 formed in the rear of the casing 12, and said bracket is clamped to the rear wall of said casing by a suitable clamp nut 24.

A main source of illumination, preferably an electric light bulb 25 of large candle power, is mounted in a socket 26 and the latter is adjustably mounted in the bracket 22 to which it is secured by a clamp screw 27. Electric wires 28 and 29 connect with the socket 26. Located above the electric light bulb 25 is a reflector 30, and the latter is adjustable toward or away from said electric light bulb through the medium of a screw-threaded rod 31, which engages a member 32 to which it is secured by a thumb screw 33. The member 32 is adjustably mounted in the bracket 22 to which it is secured by a thumb screw 34.

Projecting downwardly from the main portion of the casing 12 is an extension 35 in which a recess 36 is provided to receive a guide 37, and mounted upon said guide is a shutter 38 and negative holder 39. The guide 37 is held securely clamped within the recess 36 by thumb screws 40. The guide 37 is provided with an opening 41 therein to permit rays of light from the source of illumination 25 to pass therethrough, and the shutter 38 is mounted to slide in suitable grooves in the guide 37 above the opening 41, a stop 42 fast to said shutter engaging opposite sides of the opening 41 and thereby limiting the movement of said shutter upon said guide. The shutter 38 also has another stop 43 projecting upwardly therefrom and into the path of the negative holder 39, and the latter controls the operation of said shutter in a manner to be hereinafter more fully described.

The negative holder 39 is provided with an opening 45 therein which is similar in outline to the opening 41 of the guide 37 and aligns therewith. The negative holder 39 has a flat upper surface 46 upon which a negative 47 is placed over the opening 41 and beneath a pair of thin flat springs 48, said springs holding said negative upon said surface. A cover 49 is provided for the holder 39, said cover being pivoted to said holder by a rod 50, and a spring 51 surrounds said rod 50 and is provided with two end portions 52, both of which engage the under surface of the cover 49 and act to lift said cover from off the negative. When the holder 39 is located in its innermost position within the recess 36, the cover 49 is held down upon the negative 47, or at least very close thereto, by reason of the fact that said cover 49 engages a surface 53 at the top of the recess 36. The cover 49 has an opening 54 provided therein through which the rays of light from the source of illumination project in reaching the negative.

The negative holder 39 is provided with an abutment 55 thereon which engages a stop 43 of the shutter 38, and a pair of coil springs 56 are fastened at one end thereof to the shutter 38, and at their other ends to the guide 37, and said springs act to hold the stop 43 of said shutter against the abutment 55 during the first part of the movement to withdraw the holder 39 outwardly upon the guide 37, and during the latter part of the inward movement of said holder upon said guide. At other times the engagement of the stop 42 with the opposite side of the opening 41 from which said stop is positioned in Fig. 5, limits the movement of the shutter 38, and it is not until the negative holder is again pushed inwardly that the abutment again contacts with the stop 43.

Figure 6:
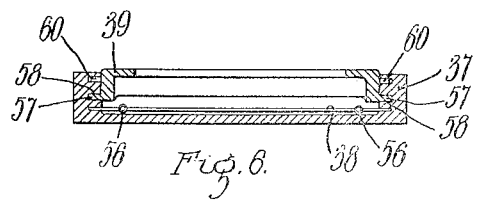
Fig. 6 is a vertical transverse section taken on the line 6—6 of Fig. 4.

The negative holder 39 is provided with flanges 57 upon opposite sides thereof, said flanges projecting into oppositely disposed grooves 58 provided in the guide 37, see Fig. 6. The negative holder 39 also has a rod 59 extending thereacross, and the opposite end portions of said rod project beyond the opposite side surfaces of said holder, and when said holder is being withdrawn from the guide 37, end portions of said rod 59 enter groove 60 provided in the opposite sides of said guide, and the opposite end portions of said rod finally engage pins 61 and 62 which obstruct the movement of the rod 59 within said grooves 60 and thereby limiting the outward movement of said holder 39 within said guide 37. The pin 61 is permanently secured in the guide 37, but the pin 62 is fastened to a latch 63 and when it is desired to entirely remove the negative holder 39 from the guide 37 the latch 63 is sprung outwardly allowing the end portion of the rod 59 to pass beyond the pin 62.

Figure 5:
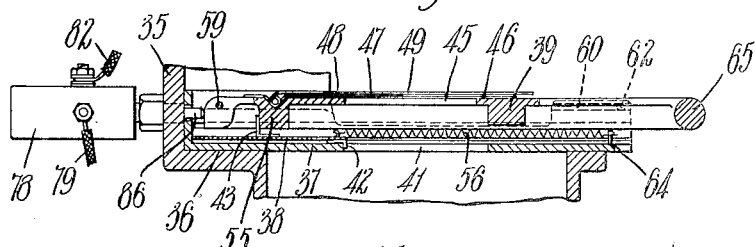
Fig. 5 is a vertical section taken on the line 5—5 of Fig. 4.
Figure 7:
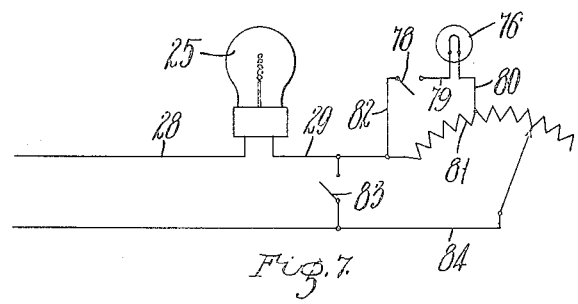
Fig. 7 is a diagrammatic representation of the electric wiring of the apparatus.

When the negative holder 39 has been withdrawn to a position where the end portions of the rod 59 engage with the pins 61 and 62, the forward end of said holder is allowed to drop until the under surface thereof engages an end portion 64 of the guide 37, see Fig. 5, at which time the cover 49 will be raised and positioned as illustrated in dotted lines in said Fig. 1.

The negative holder 39 is provided with a handle portion 65 at the front end thereof, said handle being utilized in operating said holder.

The chamber 18 of the casing 12 is connected with the recess 36 of the extension 35 of said casing by a passageway 66 which is located directly beneath the electric light bulb 35 and reflector 30, and located within said passageway 66 is a group of condsening lenses 67, the latter being located within a lens holder 68. The purpose of the lenses 67 is to spread the rays of light from the source of illumination evenly over the negative 47. Directly beneath the passageway 66 upon the opposite side of the recess 36 is another passageway 69 and a tapered casing 70 is mounted in said passageway 69 and has a group of lenses 71 located at the lower end thereof, said lenses being of well-known type and being located in a lens holder 72. The lenses 71 focus the image of the negative 47 upon the sheet of sensitized material located within a holder 73 hereinafter to be more fully described, and located upon the base 10.

In placing a negative within the negative holder 39 and positioning said negative within said holder beneath the springs 48, it is desirable that a small light shall be directed upon the negative holder, and for this purpose a bracket 74 is adjustably fastened to the extension 35 of the casing 12 and said bracket constitutes a support for a socket 75 in which an electric light bulb 76 of small candle power and constituting an auxiliary source of illumination is mounted. A reflector 77 is provided for the electric light bulb 76 and is positioned to throw the rays of light upon the negative 47 when the negative holder 39 is positioned as illustrated in dotted lines in Fig. 1.

As it is only necessary and desirable that the auxiliary source of illumination shall be effective while the negative holder 39 is located in its exterior position upon the casing 12, a means is provided for automatically opening and closing the electric circuit to said auxiliary source of illumination, which means comprise an electric switch 78 mounted at the rear of the extension 35 of the casing 12.

The electric circuit, which includes the switch 78 and electric light bulb 76, also includes a wire 79 which extends from said switch to said electric light bulb. Another wire 80 extends from the electric light bulb 76 to a resistance device 81 of any suitable form and well known to those skilled in the art, which is located upon the inner side of the door 19 of the casing 12, where access may be conveniently had thereto. Another wire 82 connects the switch 78 with the electric wire 29 previously mentioned and both of said wires are joined together and connected to a control switch 83 which is located at a convenient position upon the base 10. Another wire 84 connects the switch 83 with the resistance device 81 and the latter is operated by a handle 85 which is mounted upon the exterior of the door 19, thereby varying the candle power of the electric light bulb 25 in a manner well known to those skilled in the art.

The switch 78, which may be of any desired construction, is provided with a plunger 86, the outer extremity of which is engaged by the rear extremity of the negative holder 39, and when the latter is in its innermost position upon the guide 37, the engagement of said negative holder with said plunger 86 causes the electric circuit to the electric light bulb 76 to be broken, thereby extinguishing said light. When the negative holder is withdrawn from its innermost position within the guide 37 to the dotted line position illustrated in Fig. 1, an electric circuit through the switch 79 will be closed and the electric light 76 will be illuminated.

The holder 73, for a sheet of sensitized material 87 upon which the photograph is produced, comprises a support 88 having a flat upper surface upon which said sheet of sensitized material rests beneath a cover 89 which is hinged to the support 88 at 90. The sensitized material 87 is positioned upon support 88 with an edge thereof abutting against a plurality of positioning pins 91, said edge also being located beneath a pair of flat springs 92.

An opening 93 is provided in the cover 89 and the size and shape of said opening determines the size and shape of the photograph which is produced. The support 88 is mounted upon a positioning member 94, the latter having a plurality of pins 95 which project upwardly therefrom and into openings provided in the under surface of the support 88, and said pins position said support upon said positioning member 94. The positioning member 94 is secured to the base 10 of the apparatus by a latch 96, the latter comprising a pin 97 having an enlarged head 98 which interlocks with a plate 99 secured to the under surface of said positioning member. The latch 96 projects through a slot 100 provided in the plate 99, and the head 98 of said latch is located above said plate, a spring 101 holding the under surface of said head 98 against the upper surface of said plate. The tension of the spring 101 is varied by manipulating a nut 102 which has screw-threaded engagement with the pin 97. The positioning member 94, with the support 88 thereon, may be moved forwardly, rearwardly and sideways in unison upon the base 10, and a rotary motion may also be imparted to said members, utilizing the latch 96 as a pivot.

A plate 103, similar in all respects to the plate 99, is secured to the under surface of the support 88, and if it is so desired the positioning member 94 may be dispensed with entirely, and the support 88 may be interlocked with the latch 96, and said support may be positioned by utilizing said latch as hereinbefore mentioned. When the positioning member 95 is dispensed with, the sensitized material will be located a greater distance from the negative and the objects that are produced upon the sensitized material will be relatively larger than if the positioning member 94 was employed. A spring 104 is provided for the cover 89.

Figures 2, 3:
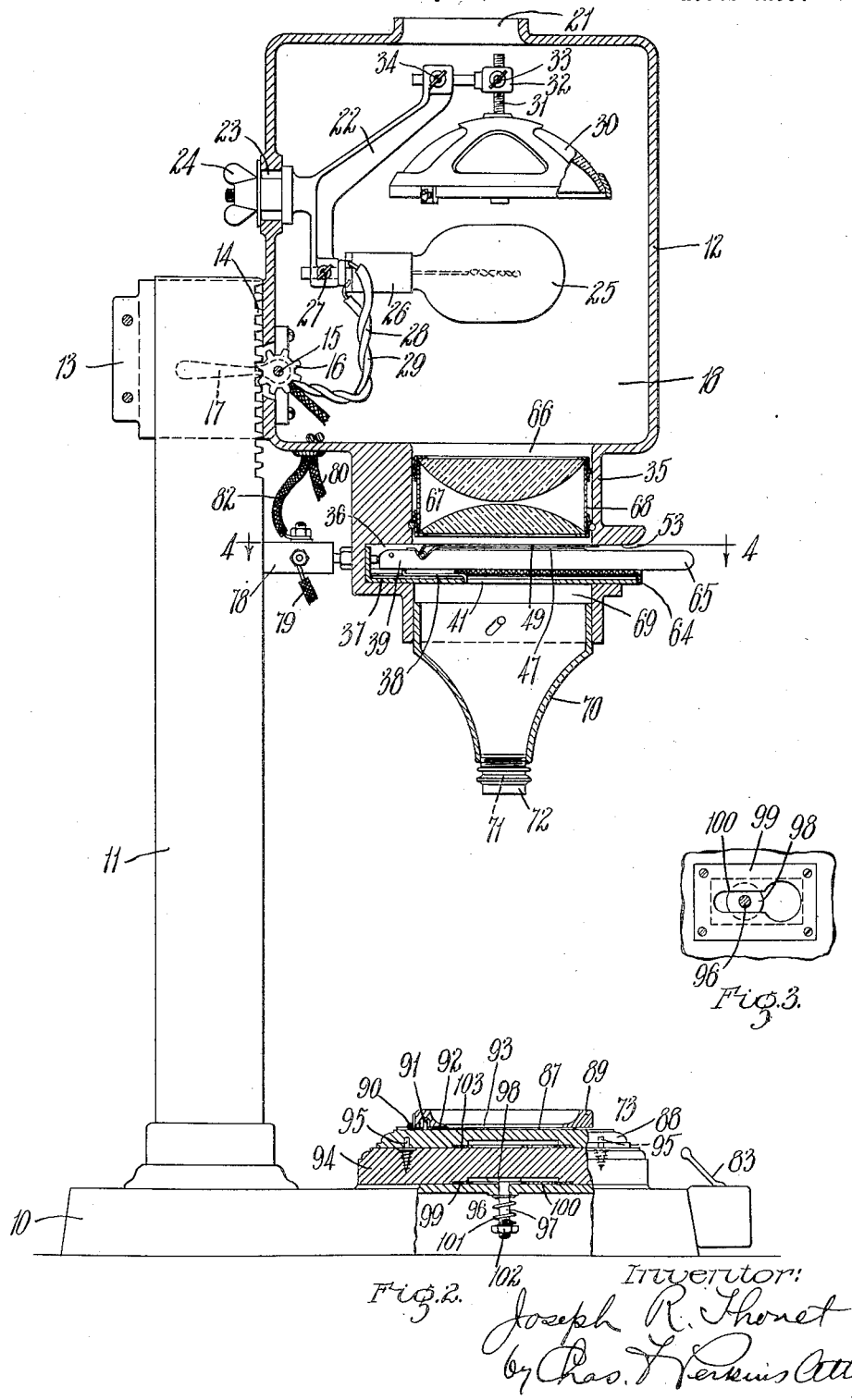
Fig. 2 is a central vertical section through the apparatus.
Fig. 3 is a detail underneath plan view of a portion of the holder for the sensitized material.
Figure 4:
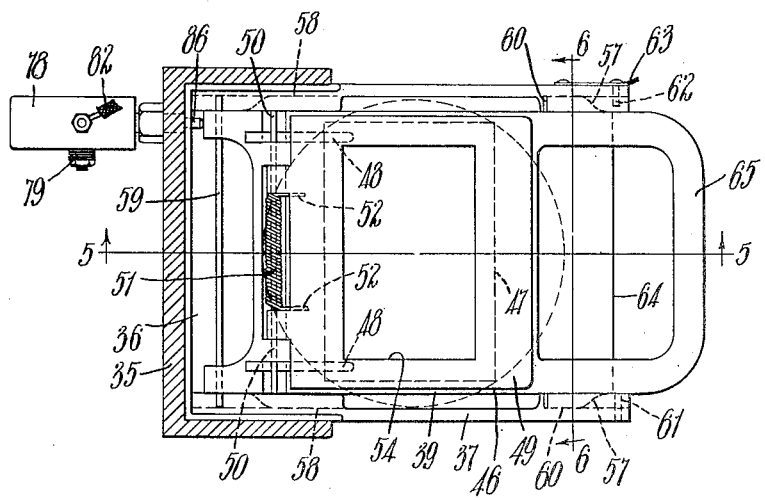
Fig. 4 is an enlarged horizontal section taken on the line 4—4 of Fig. 2.

The general operation of the apparatus hereinbefore specifically described is as follows:—Assuming that all of the parts are positioned as illustrated in Fig. 2 and that the main source of illumination 25 and reflector 30 are positioned to project rays of light when the electric circuit to said source of illumination is closed, the negative holder 39 is pulled outwardly from the guide 37 and allowed to assume the position illustrated in dotted lines in Fig. 1. During the outward movement of the negative holder, the electric circuit to the electric light bulb 76, comprising the auxiliary source of illumination, is automatically closed by the switch 78, the shutter 38 closes the opening 41 in the guide 37 and the cover 49 of said negative holder opens to the dotted line position illustrated in Fig. 1, all of these operations being automatic.

The operator then places a negative upon the negative holder beneath the springs 48, being aided in positioning said negative relatively to the opening 45 in said negative holder by the rays of light which are directed upon said holder from the electric light bulb 76.

The negative holder 39 is then lifted and pushed inwardly upon the guide 37, and as said holder moves inwardly, the cover 49 thereof engages the surface 53 at the top of the recess 36 and forces said cover downwardly upon the negative holder. When the abutment 55 of the negative holder engages the stop 43 of the shutter 38, said shutter is forced inwardly withdrawing the latter from above the opening 41, and as said holder comes to rest within said guide, the rear end of said holder engages the plunger 86 of the switch 79 and breaks the circuit to the electric light bulb 76.

If the operator of the apparatus wishes to determine whether the apparatus is properly focused to produce an image of the desired size upon the sensitized material, before said material is placed within its holder 73, he may manipulate the handle 85 of the resistance device 81 so that the electric light bulb 25, which constitutes the main source of illumination will produce a non-actinic light, giving just enough illumination to obtain the result desired when the main switch 83 is operated.

In placing the sheet of sensitized material 87 in its holder 73, the cover 89 is raised and said material is positioned against the pins 91 and beneath the springs 92, and the cover 89 is then closed upon the material. The support 88 and positioning member 94 may then be manipulated in unison beneath the head 98 of the latch 96 to position said sheet of sensitized material relatively to the light projecting mechanism located thereabove, or the positioning member 94 may be removed from beneath the support 88, and the latter may be interlocked with the latch 96 and said support may be manipulated to obtain the results desired.

When all of the various parts are positioned to produce the photograph upon the sensitized material, the switch 83 is manipulated to close the electric circuit to the main source of illumination 25 and when the proper exposure has been given, the electric circuit is again broken by operating the switch 83.

To vary the size of the objects of the negative produced upon the sensitized material, the projecting mechanism within the casing 12 may be vertically positioned relatively to the sensitized material by rotating the gear 16 upon the rack teeth 14, and raising or lowering said casing, or, a similar result may be produced to a limited extent by removing the positioning member 94 from beneath the support 88.

I claim:

1. An apparatus for enlarging photographs comprising, in combination, a holder for sensitized material, a casing, a holder for a photographic negative mounted within said casing and also adapted to be withdrawn therefrom and supported upon the exterior thereof, light projecting instrumentalities within said casing adapted to throw the image of said negative upon said sensitized material, a shutter to intercept rays of light passing from said light projecting instrumentalities to said sensitized material, means to illuminate said negative when said negative holder is located upon the exterior of said casing and means actuated by said negative holder, while being removed from and inserted within said casing, automatically to render said illuminating means effective and ineffective, said negative holder also engaging said shutter and controlling the operation thereof.

2. An apparatus for enlarging photographs comprising, in combination, a frame, a holder for sensitized material upon said frame, a holder for a photographic negative mounted upon said frame, lenses mounted upon said frame and adapted to focus the image of said negative upon said sensitized material, a main source of illumination adapted to throw rays of light upon said negative when said negative holder is positioned in alignment with said main source of illumination, said negative holder being adapted to be withdrawn from alignment with said main source of illumination and positioned out of alignment therewith, means to hold the negative holder in an inclined position upon the exterior of said frame, an auxiliary source of illumination pivotally mounted upon said frame and adapted to throw rays of light upon said negative when said negative holder is positioned out of alignment with said main source of illumination, and means actuated by said negative holder while being moved upon said frame to automatically render said auxiliary source of illumination effective and ineffective.

3. An apparatus for enlarging photographs comprising, in combination, a base, a holder for sensitized material upon said base, a casing mounted upon said base, a holder for a photographic negative mounted within said casing, means also to hold said negative holder in an inclined position upon the exterior of said casing, lenses mounted upon said casing and adapted to focus the image of said negative upon said sensitized material, a main source of illumination adapted to throw rays of light upon said negative when said negative holder is positioned within said casing, an auxiliary source of illumination adapted to throw rays of light upon said negative when said negative holder is located in its inclined position upon the exterior of said casing, and means actuated by said negative holder while being removed from and inserted within said casing, automatically to render said auxiliary source of illumination effective and ineffective.

4. An apparatus for enlarging photographs comprising, in combination, a base, a holder for sensitized material upon said base, a standard upon said base, a casing adjustably mounted upon said standard, a holder for a photographic negative mounted within said casing, means to support the negative holder in an inclined position upon the exterior of said casing, lenses mounted upon said casing and adapted to focus the image of said negative upon said sensitized material, a main source of illumination mounted in said casing and adapted to throw rays of light upon said negative when said negative holder is positioned within said casing, an electric light bulb adapted to throw rays of light upon said negative when said negative holder is located in its inclined position, and a switch for said electric light bulb, said switch being adapted to be operated automatically by said negative holder while the latter is being inserted in and removed from said casing to open and close the electric circuit to said bulb.

5. An apparatus for enlarging photographs comprising, in combination, a base, a holder for sensitized material upon said base, a standard upon said base, a casing adjustably mounted upon said standard, a holder for a photographic negative mounted within said casing and also adapted to be withdrawn therefrom and supported upon the exterior thereof, lenses mounted upon said casing and adapted to focus the image of said negative upon said sensitized material, a main source of illumination mounted in said casing and adapted to throw rays of light upon said negative when said negative holder is positioned within said casing, a shutter upon said casing to intercept rays of light passing from said source of illumination to said sensitized material, an electric light bulb mounted upon the exterior of said casing and adapted to throw rays of light upon said negative when said negative holder is positioned upon the exterior of said casing, and a switch for said electric light bulb, said switch being operated automatically by said negative holder while the latter is being inserted in and removed from said casing to open and close the electric circuit to said bulb, said negative holder also engaging said shutter and controlling the operation thereof.

6. An apparatus for enlarging photographs comprising, in combination, a base, a holder for sensitized material upon said base, a standard upon said base, a casing adjustably mounted upon said standard, a holder for a photographic negative mounted within said casing, means to support the negative holder in an inclined position upon the exterior of said casing, a cover for said negative holder, lenses mounted upon said casing and adapted to focus the image of said negative upon said sensitized material, a main source of illumination mounted in said casing and adapted to throw rays of light upon said negative when said negative holder is positioned within said casing, an electric bulb mounted upon the exterior of said casing and adapted to throw rays of light upon said negative when said negative holder is located in its inclined position and a switch for said electric light bulb, said switch and cover being operated automatically by said negative holder while the latter is being inserted in and removed from said casing.

7. An apparatus for enlarging photographs comprising, in combination, a base, a holder for sensitized material upon said base, a standard upon said base, a casing adjustably mounted upon said standard, a holder for a photographic negative mounted within said casing, means to support the negative holder in an inclined position upon the exterior of said casing, a cover for said negative holder, lenses mounted upon said casing and adapted to focus the image of said negative upon said sensitized material, a main source of illumination mounted in said casing and adapted to throw rays of light upon said negative when said negative holder is positioned within said casing, a shutter upon said casing adapted to intercept rays of light passing from said source of illumination to said sensitized material, an electric light bulb mounted upon the exterior of said casing and adapted to throw rays of light upon said negative when said negative holder is located in its inclined position, and a switch for said electric light bulb, said switch, shutter and cover all being operated automatically by said negative holder while the latter is being inserted in and removed from said casing.

8. An appparatus for enlarging photographs comprising, in combination, a base, a holder for sensitized material upon said base, a standard upon said base, a casing adjustably mounted upon said standard, a guide mounted within said casing, a holder for a photographic negative mounted upon said guide, means to support the negative holder in an inclined position upon the exterior of said casing, lenses mounted upon said casing and adapted to focus the image of said negative upon said sensitized material, a main source of illumination mounted within said casing and adapted to throw rays of light upon said negative when said negative holder is positioned within said casing, a shutter slidably mounted upon said guide to intercept rays of light passing from said source of illumination to said sensitized material, an electric light bulb pivotally mounted upon the exterior of said casing to throw rays of light upon said negative when said negative holder is located in its inclined position, and a switch for said electric light bulb, said switch being operated automatically by said negative holder while the latter is being inserted in and removed from said casing to open and close the electric circuit to said bulb, said negative holder also engaging said shutter and controlling the operation thereof.

9. An apparatus for enlarging photographs comprising, in combination, a base, a holder for sensitized material upon said base, a standard upon said base, a rack upon said standard, a casing upon said standard, a gear in said casing engaging said rack and adapted to move said casing vertically upon said standard, means to clamp said casing to said standard, a holder for a photographic negative mounted within said casing, means to support the negative holder in an inclined position upon the exterior of said casing, a cover for said negative holder, lenses mounted upon said casing and adapted to focus the image of said negative upon said sensitized material, a main source of illumination mounted in said casing and adapted to throw rays of light upon said negative when said negative holder is positioned within said casing, a shutter upon said casing to intercept rays of light passing from said source of illumination to said sensitized material, an electric light bulb mounted upon the exterior of said casing and adapted to throw rays of light upon said negative when said negative holder is located in its inclined position, and a switch for said electric light bulb, said switch, shutter and cover being operated automatically by said negative holder while the latter is being inserted in and removed from said casing.

10. An apparatus for enlarging photographs comprising, in combination, a base, a casing mounted upon said base, a holder for a photographic negative mounted within said casing; means to support the negative holder in an inclined position upon the exterior of said casing, a positioning member, a latch to clamp said positioning member to said base and also constituting a pivot for said positioning member, a support for sheet of sensitized material mounted upon said positioning member, light projecting instrumentalities within said casing adapted to throw the image of said negative upon said sensitized material, means to illuminate said negative when said negative holder is located in its inclined position, and means actuated by said negative holder while being removed from and inserted within said casing, automatically to render said illuminating means effective and ineffective.

11. An apparatus for enlarging photographs comprising, in combination, a base, a casing mounted upon said base, a holder for a photographic negative mounted within said casing, means to support the negative holder in an inclined position upon the exterior of said casing, a positioning member, a latch adapted to clamp said positioning member to said base and also constituting a pivot for said positioning member, a support for a sheet of sensitized material mounted upon said positioning member, said support also being adapted to be removed from said positioning member and clamped directly to said base by said latch, thereby varying the distance between said negative holder and sensitized material, light projecting instrumentalities, within said casing, to throw the image of said negative upon said sensitized material, means to illuminate said negative when said negative holder is located in its inclined position, and means actuated by said negative holder while being removed from and inserted within said casing, automatically to render said illuminating means effective and ineffective.

12. An apparatus for enlarging photographs comprising, in combination, a base, a casing mounted upon said base, a holder for a photographic negative mounted within said casing and also adapted to be withdrawn therefrom and supported upon the exterior thereof, a positioning member, a latch adapted to hold said positioning member in frictional contact with said base and also constituting a pivot for said positioning member, means to vary the amount of pressure exerted by said latch upon said positioning member, a support for a sheet of sensitized material mounted upon said positioning member, light projecting instrumentalities within said casing adapted to throw the image of said negative upon said sensitized material, means to illuminate said negative when said negative holder is located upon the exterior of said casing, and means actuated by said negative holder while being moved from and inserted within said casing, automatically to render said illuminating means effective and ineffective.

13. In an apparatus for enlarging photographs, a frame, a guide detachably mounted upon said frame, a holder for a photographic negative slidably mounted upon said guide, means upon said guide to hold the negative holder in an inclined position thereon, a cover for said negative holder, and means to automatically raise said cover as said holder is moved to said inclined position.

14. In an apparatus for enlarging photographs, a frame, a guide detachably mounted upon said frame, a holder for a photographic negative slidably mounted upon said guide, means upon said guide to hold said negative holder in an inclined position thereon, springs to secure a negative upon said holder, a cover for said negative holder, and a spring to automatically raise said cover as said holder is moved to said inclined position.

15. In an apparatus for enlarging photographs, a frame, a guide mounted upon said frame, a holder for a photographic negative slidably mounted upon said guide, a cover for said negative holder, means to automatically raise said cover when said holder is moved into a position to have a negative inserted therein and removed therefrom, and a shutter upon said guide and controlled by said negative holder.

16. In an apparatus for enlarging photographs, a frame, a guide mounted upon said frame and provided with an opening therein, a holder for a photographic negative slidably mounted upon said guide, a shutter slidably mounted upon said guide, and a spring to move said shutter to close said opening, said shutter being actuated by said negative holder to remove the same from above said opening.

17. In an apparatus for enlarging photographs, a casing, a guide mounted within said casing, a holder for a photographic negative slidably mounted upon said guide and adapted to be moved thereon from the interior of said casing to the exterior thereof, means upon said guide to hold said negative holder in an inclined position upon the exterior of said casing, a cover for said negative holder, and a spring to automatically raise said cover as said holder is moved to said inclined position.

18. In an apparatus for enlarging photographs, a casing, a guide mounted within said casing, a holder for a photographic negative slidably mounted upon said guide and adapted to be moved thereon from the interior of said casing to the exterior thereof and tipped to an inclined position, said holder being provided with an opening extending therethrough, a cover for said negative holder, a spring to raise said cover as said holder is moved to said tipped position, a shutter slidably mounted upon said guide, and a spring to move said shutter to close said opening, said shutter being actuated by said negative holder to remove the same from above said opening.

In testimony whereof I have hereunto set my hand this eighth day of July, 1926.

JOSEPH R. THONET.